Dec. 23, 1958 J. BUDNICK 2,865,981
ELECTRICAL FITTING ENTRANCE CAP
Filed May 11, 1955 2 Sheets-Sheet 1

INVENTOR
JOSEPH BUDNICK
BY Eugene S. Lovette
ATTORNEY

Dec. 23, 1958 J. BUDNICK 2,865,981
ELECTRICAL FITTING ENTRANCE CAP
Filed May 11, 1955 2 Sheets-Sheet 2

INVENTOR
JOSEPH BUDNICK
BY Eugene S Lovette
ATTORNEY

United States Patent Office 2,865,981
Patented Dec. 23, 1958

2,865,981

ELECTRICAL FITTING ENTRANCE CAP

Joseph Budnick, New York, N. Y., assignor to Electrical Fittings Corporation, Woodside, N. Y., a corporation of New York Application May 11, 1955, Serial No. 507,655

7 Claims. (Cl. 174—81)

This invention relates to electrical fittings for coupling outdoor transmission lines to electrical raceways, and in particular to entrance cap connectors.

The entrance cap connector is usually mounted at the top of a metallic raceway, for example rigid conduit. The raceway in turn is supported against the wall of a building. The raceway provides a protective sheath for the feeder transmission lines extending therethrough. The raceway extends through the wall and into the building or terminates at an electric meter mounted on the wall of the building. In this manner electric power is tapped from the outdoor power line and brought into a building for use. The entrance cap serves to complete the electrical connection to the outdoor feeder line. Since coupling to the entrance cap takes place outdoors, this fitting is shaped and designed to ensure maximum protection against the elements.

A common example of past and present entrance cap use is at a home installation which home is supplied with electrical power from a power station in those areas where the utility power lines extend outdoors. In such areas, the utility company extends a tapped transmission line (the feeder line) from its main line into the top of the entrance cap. The bottom of the entrance cap is coupled to the rigid conduit raceway, or its equivalent which couples into the electric meter. Thus the feeder line is coupled to the meter.

The entrance cap consists of four components: a hollowed or bowl-shaped cover, an insulated window member, a removable clamp strap and a forked body. The forked body is bifurcated at one end to engage the window; the other end is provided with a raceway coupling for connection with rigid conduit or electrical metallic tubing. In spite of its simplicity of design and structure, installation of the entrance cap is difficult and cumbersome mainly because it is located high along the wall of a house. The entrance cap is generally located at a height comparable to the height of the utility company's transmission line, otherwise the line tapped therefrom would be suspended close to the ground. It is desirable to keep the utility lines a far and safe distance from the ground to avoid among other things interference by or injuries to passersby.

Installation of a prior art entrance cap is made difficult and trying because the electrician must carry the disassembled parts of the entrance cap and, in addition, one end of the feeder line, up a ladder to the top end of the feeder conduit. Very often the electrician is in an awkward position which makes the connection, if not difficult, a cumbersome task to complete. In all instances the electrician must observe caution to prevent one or more of the disassembled parts from falling to the ground which would cause a loss of time to retrieve.

Prior to completing the connection, the conduit is usually first anchored to the wall of the building. Straps spaced along the feeder conduit are used to anchor this raceway. Some prior art entrance caps are threadedly coupled to the raceway. When this type of cap is used, the top end of the raceway is not strapped to the building until after the entrance cap connection is completed. The unstrapped top end of the raceway may be pulled away from the wall to provide enough clearance to enable the electrician to threadedly couple the entrance cap to the raceway. Having partially anchored the feeder conduit, the electrician mounts a stepladder to the top of the feeder conduit to threadedly couple the bifurcated element to the feeder. The end of the feeder line is drawn through a knock-out hole in the insulated window after which the window and cover are fitted into place and the entrance cap parts are anchored together by bolts. Upon completion of the assemblage of the cap, the upper part of the feeder line is anchored to the wall.

It is therefore the main object of this invention to provide an improved entrance cap design which does not require disassemblage of its parts to effect coupling to a feeder line. To accomplish this object, the cover of the entrance cap is hinged to the clamping body of the entrance cap. The feeder line is coupled through the entrance cap when the cover is rotated to the opened position. At all times the cover remains physically attached to the clamping body. Furthermore, the clamping body is designed to keep the window seated in its position while the connection is being made. The instant invention relieves the electrician of working with disassembled parts of an entrance cap while connecting same to a feeder conduit. Furthermore, the invention overcomes the problem of parts falling to the ground.

The entrance cap of the instant invention does not require a clearance space between the feeder line and the wall of the building. Consequently the feeder may be anchored to the wall along its full length in contrast to the practice of splitting this phase of the job into two parts as noted for prior art entrance caps. This advantage is made possible by providing strap clamps at the connecting end of the clamping body as the means of attaching the cap to the conduit. Furthermore the clamping body is so designed that no part protrudes to interfere with attachment of the entrance cap to the feeder line.

Accordingly it is a further object of the invention to provide an entrance cap design that simplifies connection to feeder conduit and which permits the connection to be completed in a shorter time.

It is a further object of the invention to provide an entrance cap which provides a maximum degree of protection against the elements.

Figure 1:
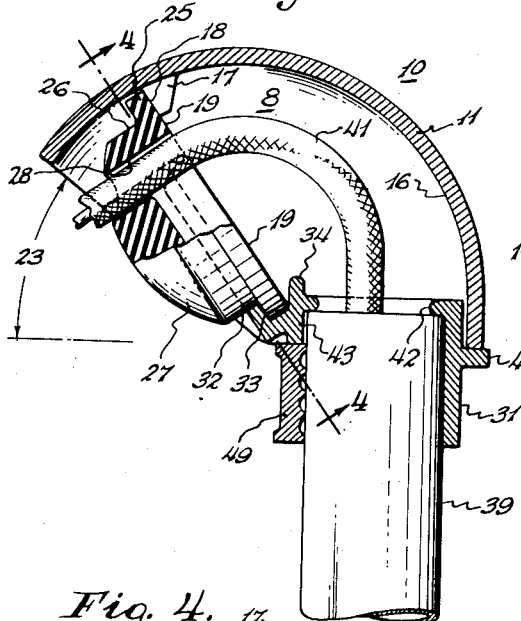
Fig. 1 is a side view, partly in section, of an entrance cap incorporating the features of the invention.

Referring now to the figures, entrance cap connector 10 consists of four elements: a cover 11, an insulated window 12, a clamp strap 49, and a bifurcated clamp body 13.

Cover 11 is a hollow, bowl-shaped metallic body. It provides protection against the weather. Cover 11 is provided with a deep, trough-shaped inner surface 16 which forms an enclosed cavity 8 when cap 10 is assembled. Feeder wire 41 extends through cavity 8. One feature of the design is that the radius of cavity 8 is relatively large. Consequently it is easy to pull wire 41 therethrough upon installation. Inner surface 16 is provided with a smooth finish. Two recessed ledges 14, 15 are provided along the opposite sides of inner surface 16 of cover 11. Ledges 14, 15 are contoured to register with and engage the forward ends of the bifurcated prongs 29, 30 of clamp 13 upon assembly of cap 10. Two spaced apart abutments 17, 17 extend radially from inner surface 16 near the forward or front side of cover 11.

Figure 4:
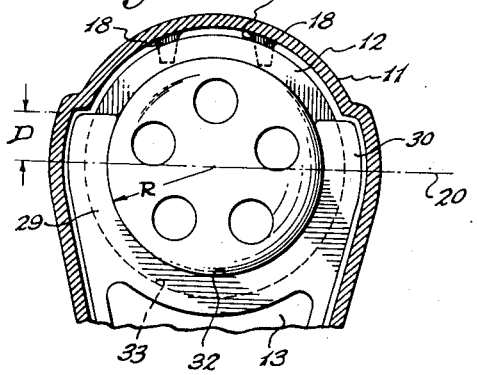
Fig. 4 is a view of the entrance cap taken along lines 4—4 of Fig. 1.

The forward surfaces 18 of abutments 17 are smooth and flat. The rear surface 19 of window 12 rests against surfaces 18 upon assembly of entrance cap 10. One side of cover 11 is provided with a lug 21 protruding downwardly from its side wall. Lug 21 is provided with a bolt hole to receive threaded bolt 22. Lug 21 is located so that its bolt hold is aligned with a correlated threaded hole provided in the collar 31 of clamp 13 upon assembly of entrance cap 10. From Fig. 1 it will be seen that the forward or front side of cover 11 terminates in a plane which is angularly spaced from the horizontal. The angle of displacement is illustrated by reference number 23. In a preferred embodiment, this angle was chosen to be approximately 38°. The face of the forward or front side of cover 11 is circular-shaped to fit over window 12 which would be seated between fingers 29, 30; note Fig. 4. Similarly, the rear side of cover 11 is circular-shaped to fit over the circular-shaped collar 31 of clamp 13. In the preferred embodiment, cover 11 and clamp 13 are made of aluminum castings of sufficient thickness to provide a sturdy entrance cap for outdoor use.

Insulator window 12 contemplated for use with the instant invention may be of the type employed in the prior art entrance caps. Window 12 may be made of hard synthetic resin material or some other equally rugged electrical insulating material. Window 12 is a circular-shaped truncated element having a flat smooth rear surface 19 and an inner surface 24 receding therefrom. Window 12 is flanged with a circular rim 25 and has a cylindrical side wall 26 and a top surface 27. Window 12 is provided with spaced apart knock-out holes 28 adapted to receive the feeder line 41 therethrough. The knock-out hole 28 is opened for use by pressure against the thin cover thereat which can be easily forced out of its place.

Figure 2:
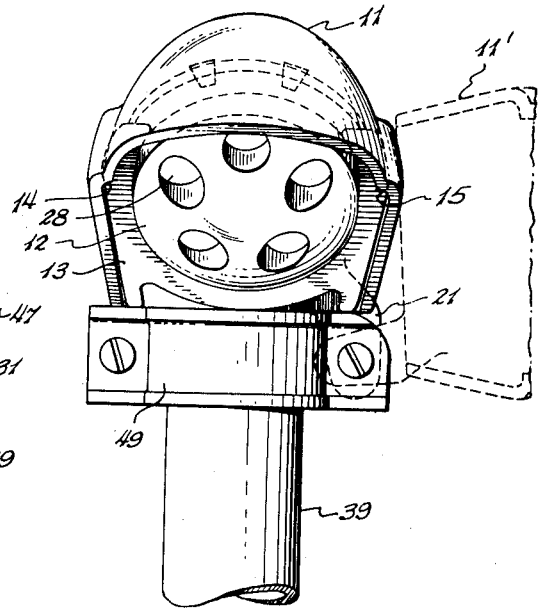
Fig. 2 is a face view of the entrance cap shown clamped to rigid conduit, and also illustrates by means of dashed lines the position of the cover when it is swiveled to its opened position.
Figure 3:
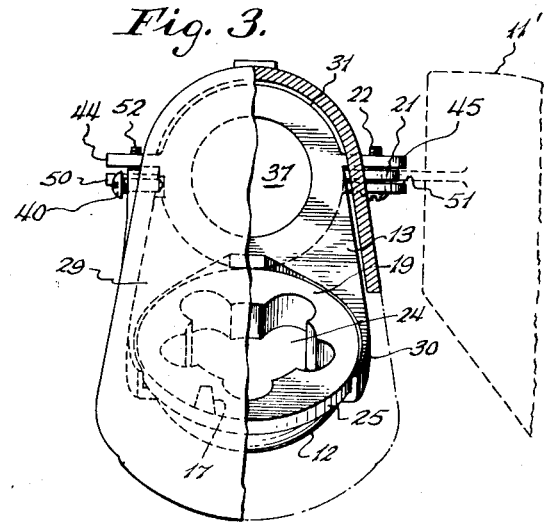
Fig. 3 is a top of the entrance cap partly in section and partly cut away, also showing the cover in its opened position by means of dashed lines.
Figure 5:
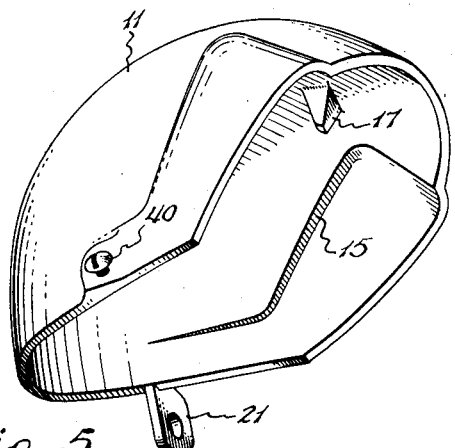
Fig. 5 is a perspective view of the cover element.
Figure 6:
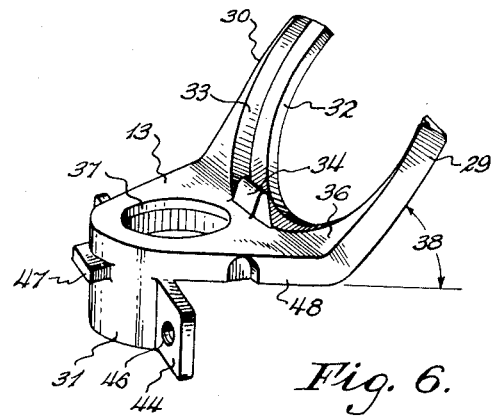
Fig. 6 is a perspective view of the bifurcated clamp incorporating the features of the instant invention.

The bifurcated clamp 13 is provided, at its front side, with oppositely disposed fingers or prongs 29, 30 joined by circular shoulders or edges 32, 33. Edges 32 and 33 form a seat into which window 12 is positioned; wall 26 rests against edge 32 and rim 25 rests against edge 33. The radii of edges 32, 33 are dimensioned to be slightly greater than the corresponding dimensions of the engaging parts of window 12 to enable effortless register of window 12 into its seated position upon assemblage of cap 10. In the preferred embodiment, the difference between the corresponding diameters is 1/16 of an inch. An abutment 34 is centrally located along the surface of edge 33. Abutment 34 extends upwardly and serves to hold window 12 in its seated position. Should the window 12 tend to fall backwards from its seated position, rear surface 19 of window 12 would abut against all three abutments 34, 17 and 17 to prevent such escape. While the connection is being made, it will be seen from the description hereinafter that cover 11 is swiveled to its open position which removes the support provided by abutments 17. The opened position is represented by the dashed-line body marked off by reference number 11' in Figures 2 and 3. In this opened condition, window 12 is held in place by abutment 34 and the grip provided by fingers 29, 30. In order that fingers 29, 30 assist in holding window 12 in position, the fingers are extended so that their ends terminated beyond the center line 20 a distance illustrated by reference D. In other words, the circumference of edge 32 is greater than $\pi R$ where R is the radius of edge 32. Accordingly, fingers 29, 30 are predeterminedly designed to extend a peripheral dimension greater than a semicircle.

Extending the length of fingers 29, 30 beyond the center line 20 will produce the desirable grip on window 12 and thus prevent window 12 from escaping the bifurcated body 13 while cover 11 is in its opened position. In one preferred embodiment, for a radius R of .843 inch, the dimension D is made .406 inch. It was found that the following formula provides a dimension D that offers desirable results: The sum of R and D equal to 74 to 76 percent of 2R, i. e.

$$R+D=.76{}^{+.00}_{-.02}(2R)$$

This novel design in cooperation with abutment 34 provides a seat for window 12 in which the window 12 may be positioned and held therein in spite of any vibration or disturbance which is to be expected while an electrician completes the connection.

The virtue of this novel arrangement is that it permits the electrician to open entrance cap 10, pierce such knockout holes as needed, pull the feeder wire 41 therethrough without any fear that window 12 will escape from its seat. At all times, from the moment the assembled cap 10 is opened until it is closed again, the electrician can work with the assurance that window 12 will remain in its place and furthermore that cover 11 will be maintained physically attached to clamp 13.

The top surface 36 of clamp 13 is horizontal in the region surrounding aperture 37, but surface 36 is angled from the horizontal in the region of fingers 29, 30. For a preferred embodiment dimension 38 was chosen to be approximately 55°. The surfaces of recessed ledges 14, 15 of cover 11 are shaped to register with respective fingers 29, 30.

The lower end of clamp 13 is provided with clamping means to which the end of rigid conduit 39 may be firmly attached. Circular opening 37 provides the means through which the feeder wires 41 are introduced into cavity 8. An annular lip 42 having a smooth rounded edge serves as an abutment against which the end of the feeder conduit 39 rests. A vertical, cylindrical wall 43 concentric and below lip 42 acts as a guide for the end of feeder conduit 39. A collar 31 extends downwardly at the rear of opening 37 to form a clamp strap at rear side of body. Clamp has two oppositely extending transverse ears 44, 45. Ears 44, 45 have threaded holes 46. Ear 45 is so designed that threaded hole 46 lines up with bolt hole of lug 21. An abutment 47 extends transversely from the rear wall of collar 31 and serves as a support for the edge at the rear side of cover 11. The portion of collar 31 above abutment 47 is designed to lie within and along inner surface 16 of cover 11 upon assembly of cap 10. Clamp 13 is designed so that its side walls 48 lie within and along the side wall portion of inner surface 16 upon entrance cap assembly. In keeping with this design, it will be noted that fingers 29, 30 also lie within cover 11 upon assemblage of cap 10. Fingers 29, 30 register with respective recesses 14, 15. Only abutment 47 and the portion of collar 31 and ears 44, 45 extending downwardly therefrom are designed to protrude out from cover 11 upon assemblage of cap 10.

The clamp is completed by a semi-circular strap 49 designed to grip conduit 39. Strap 49 consists of two transversely extending ears 50, 51 joined by a circularly shaped body. Openings in ears 50, 51 are designed to line up with respective threaded holes 46 of ears 44, 45 when strap 49 is used as a clamp.

A further novel aspect of the improved entrance cap 10 design resides in having all parts of clamp body 13 (other than abutment 47 and the exposed collar 31 and its associated ears 44, 45) telescopically disposed within cover 11 upon assembly of cap 10. Looking at the front side of the assembled cap 10, which is the view observed by the electrician while he is completing the connection, it is seen that no part of the entrance cap apparatus protrudes in front of feeder conduit 39. This allows an unobstructed approach when one is about to clamp conduit 39. After conduit 39 is inserted into its place, strap 49 may be attached to entrance cap 10 without the need of working around any downwardly protruding parts as is the case with the prior art design.

Entrance cap 10 has three bolts 22, 52 and 40. Bolts 22, 52 are designed for threaded engagement with bolt holes 46. Bolt 22 extends along an axis substantially from the front to the rear side of the entrance cap 10. Bolt 22 also serves to connect pivotally cover 11 to clamp body 13 so that the cover 11 may rotate with respect to the latter about the axis of bolt 22. Bolt 40 engages a threaded hole at the side of cover 11. When fully engaged, the inner end of bolt 40 passes through a threaded hole in cover 11 and extends into a recess in the side of clamp body 13. Engagement with the recess locks cover 11 in a closed position. Cover 11 may be unlocked by unthreading bolt 40 until its inner end is disengaged from the recess.

Furthermore the design of the instant invention provides an arrangement whereby the heads of all the bolts are clearly exposed and thus may be approached for disengagement or engagement without any difficulty. In addition, the need of a clearance between the entrance cap 10 and the building wall is eliminated by use of clamping straps as the means for attaching cap 10 to conduit 39. This overcomes the need of splitting the job of attaching conduit 39 to the wall into two phases which is the practice generally resorted to when threaded means are used to make the attachment. In order to use entrance cap 10, bolts 22, 52 are loosened so that entrance cap 10 may be mounted on the top end of a conduit 39. By withdrawing bolt 40 so that it clears its recess, cover 11 may be swivelled to its opened position about bolt 22. The opened position is indicated by the dashed-outline indicated by reference 11' in Figures 2 and 3. Feeder line 41 is brought through a knock-out hole 28 of window 12 and a splice is completed with the utility line. Cover 11 is swung back to its closed position. It will be noted that throughout its use, the components of cap 10 remain attached. As a matter of fact, once cap 10 leaves the factory there is never any need to disassemble the unit again.

It is intended that the disclosure set forth herein and shown in the attached drawings shall be interpreted as illustrative and not in any limited sense.

What is claimed is:

1. A service entrance cap adapted to support an insulated window member and arranged to be mounted to the upper end of a tubular conduit for electrical conducting wires comprising, a rigid and inverted bowl-like cover having an inner surface, a clamping body having front and rear sides, a pair of forwardly extending fingers at the front side of said body providing a bifurcated seat for nesting said window member, means on the inner surface of said cover and means on said clamping body cooperating to prevent said window member from falling away from its seat when said body and cover are in closed assembled relationship, and means pivotally connecting said cover to said body, said last-mentioned means including a pivot lying along an axis extending substantially from the front side to the rear side of said body, whereby said cover may be rotated to assume an opened position removed from said body and a closed position superimposing said body and seated window member while the entrance cap is mounted to the tubular conduit.

2. Apparatus as defined in claim 1 wherein, said clamp body means including a raised abutment disposed substantially between and rearwardly of said fingers; said body having a collar depending therefrom; said collar having arcuate inner surface defining a strap connection jaw for gripping the tubular conduit; and said pivotal means including, a lug on said cover aligned with an ear on said body collar, and said pivot rotatably interconnecting said lug and ear.

3. A service entrance cap adapted to support an insulated member and arranged to be clamped to conduit for electrical conducting wires comprising, a rigid and inverted bowl-like cover having an inner surface and also having front and rear sides, a clamping body having an arcuate seat for nesting the member, the front side of said cover being spaced upwardly from and cooperating with said arcuate seat to form a retaining seat for said member upon closed assembled relationship of said cover and body, said body and cover forming an internal cavity for electrical wires when in closed assembled relationship, means on the inner surface of said cover and adjacent the front side thereof, means on said clamping body and cooperating with said first means to prevent said member from falling away from its seat when said body and cover are in closed assembled relationship, and means pivotally connecting said cover to said body, said last-mentioned means including a pivot lying along an axis extending substantially from said front side to said rear side of said cover, whereby, said cover is rotatable about an axis extending substantially from the front side to the rear side thereof so that the cover may be rotated to assume an open position removed from said body and a closed position superimposing said body and seated member.

4. Apparatus as defined in claim 3 wherein said pivotal means including a lug depending integrally from said cover, an ear extending from said body and aligned with said lug, said pivot being a bolt member engaging said lug and ear, the axis of cover rotation being the axis of said bolt member.

5. Apparatus as defined in claim 4 wherein the arcuate seat of said clamp body comprising bifurcated fingers extending along the periphery of a circle and including adjacently spaced arcuate shoulder means against which said member rests when in seated position.

6. Apparatus as defined in claim 3 wherein said clamp body means includes a substantially upstanding shoulder adjacent to and to the rear of said seat and said cover means includes abutment surfaces depending from the inner surface thereof.

7. A service entrance cap adapted to support an insulated member having a peripheral flange and which entrance cap is arranged to be clamped to conduit for electrical conducting wires comprising, a rigid cover having an inner surface and also having front and rear sides, a clamping body having a front side, a shoulder edge at the front side of said clamping body for nesting engagement with the peripheral flange of the member and defining a retaining seat for the insulated member, the retaining seat of said clamping body prevents said member against falling away from its seat when said body and cover are in closed and opened assembled relationship, the front side of said cover being spaced upwardly from and cooperating with said body to form an internal cavity for electrical wires when said body and cover and insulated member are in closed assembled relationship, a lug depending from said cover, an ear extending integrally from said body and aligned with said lug, and bolt means pivotally connecting said cover to said body, the axis of said bolt means extending substantially from the front side to the rear side of said cover whereby said cover is rotatable about the axis of said bolt means and wherein the cover may be rotated to asume an open position removed from said body and a closed position superimposing said body and seated member.

References Cited in the file of this patent

UNITED STATES PATENTS

| 1,284,291 | Fort | Nov. 12, 1918 |
| 2,404,152 | Weller | July 16, 1946 |
| 2,739,999 | Gill | Mar. 27, 1956 |

FOREIGN PATENTS

| 35,037 | Denmark | Sept. 10, 1925 |